(12) United States Patent
Nunez et al.

(10) Patent No.: US 8,550,104 B2
(45) Date of Patent: Oct. 8, 2013

(54) PRESSURE CONTROL AND RELIEF SYSTEM

(75) Inventors: Mario Nunez, Chicago, IL (US); Krzysztof A. Panklewicz, Buffalo Grove, IL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 611 days.

(21) Appl. No.: 12/587,280

(22) Filed: Oct. 5, 2009

(65) Prior Publication Data

US 2011/0079295 A1 Apr. 7, 2011

(51) Int. Cl.
*F16K 17/14* (2006.01)
*F16K 17/40* (2006.01)
*B65D 90/34* (2006.01)

(52) U.S. Cl.
USPC .................. 137/71; 137/68.23; 220/89.2

(58) Field of Classification Search
USPC ................ 137/71, 68.23; 220/89.2
See application file for complete search history.

(56) References Cited

U.S. PATENT DOCUMENTS

| 1,306,150 | A | | 6/1919 | Kessler |
| 1,432,216 | A | | 10/1922 | Steinmeyer |
| 1,511,610 | A | | 10/1924 | Holmes |
| 1,698,616 | A | | 1/1929 | Woodham |
| 2,079,164 | A | * | 5/1937 | Glab ................................ 137/69 |
| 2,098,399 | A | * | 11/1937 | Munson ....................... 220/89.2 |
| 2,526,795 | A | * | 10/1950 | Andrews ..................... 220/89.2 |
| 2,831,500 | A | | 4/1958 | Fennema et al. |
| 2,922,544 | A | | 1/1960 | Hibbard et al. |
| 3,485,082 | A | * | 12/1969 | Myers ............................. 73/1.72 |
| 3,587,634 | A | | 6/1971 | Krause |
| 3,872,875 | A | | 3/1975 | Raidl, Jr. |
| 5,150,880 | A | | 9/1992 | Austin, Jr. et al. |
| 5,465,753 | A | | 11/1995 | Schwartz |
| 5,513,767 | A | | 5/1996 | Daehn |
| 5,673,897 | A | | 10/1997 | Crochet et al. |
| 5,782,259 | A | | 7/1998 | Ledbetter et al. |
| 5,887,567 | A | * | 3/1999 | White et al. ................... 123/294 |
| 5,941,268 | A | | 8/1999 | Ross, Jr. |
| 6,431,196 | B1 | | 8/2002 | Brazier et al. |
| 6,668,853 | B2 | * | 12/2003 | Dean ........................ 137/315.04 |
| 2007/0102041 | A1 | | 5/2007 | Poulter |
| 2007/0116546 | A1 | | 5/2007 | Dearing |

OTHER PUBLICATIONS

International Search Retort dated Mar. 28, 2011; 10 pgs.

* cited by examiner

*Primary Examiner* — John Rivell
*Assistant Examiner* — Daphne M Barry
(74) *Attorney, Agent, or Firm* — Seyfarth Shaw LLP

(57) ABSTRACT

A pressure control system for controlling pressure in a tank is provided. The pressure control system includes a pressure relief valve and a rupture disc subassembly. The pressure relief valve is connected to the tank. The rupture disc subassembly is located between the pressure relief valve and the tank and is connected to the tank. The pressure relief valve is connected such that removal of the pressure relief valve does not affect the connection of the rupture disc subassembly to the tank.

27 Claims, 4 Drawing Sheets

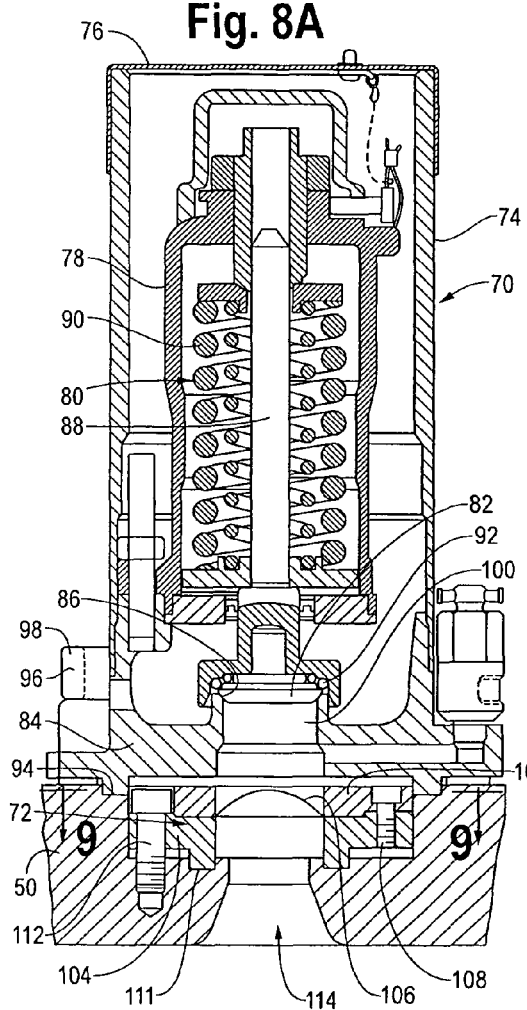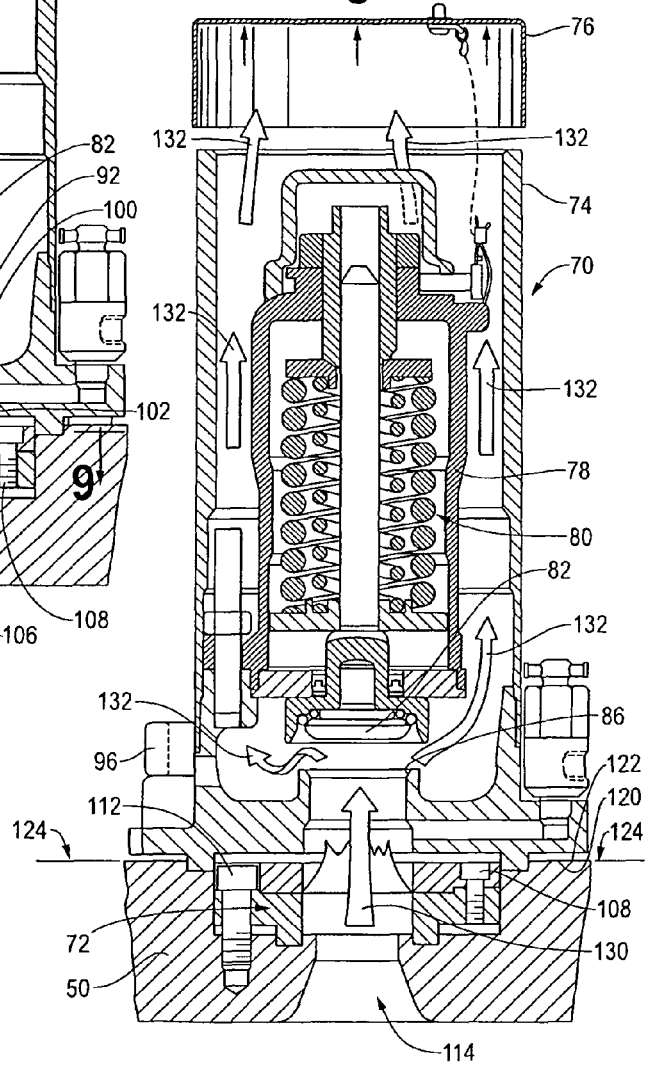

Fig. 9
Fig. 10
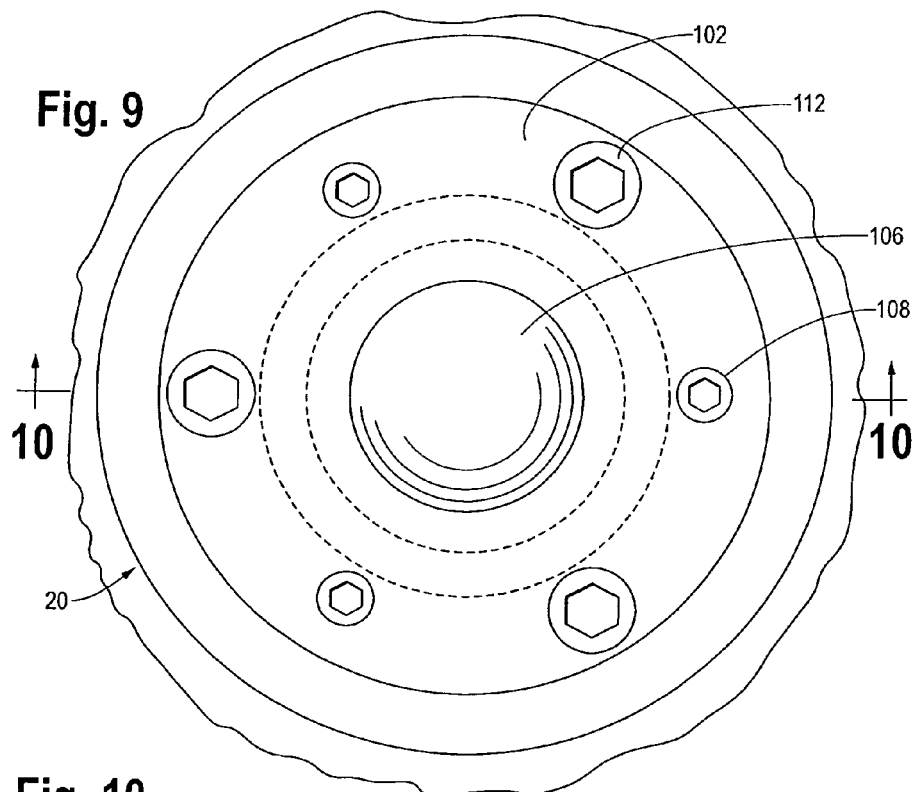
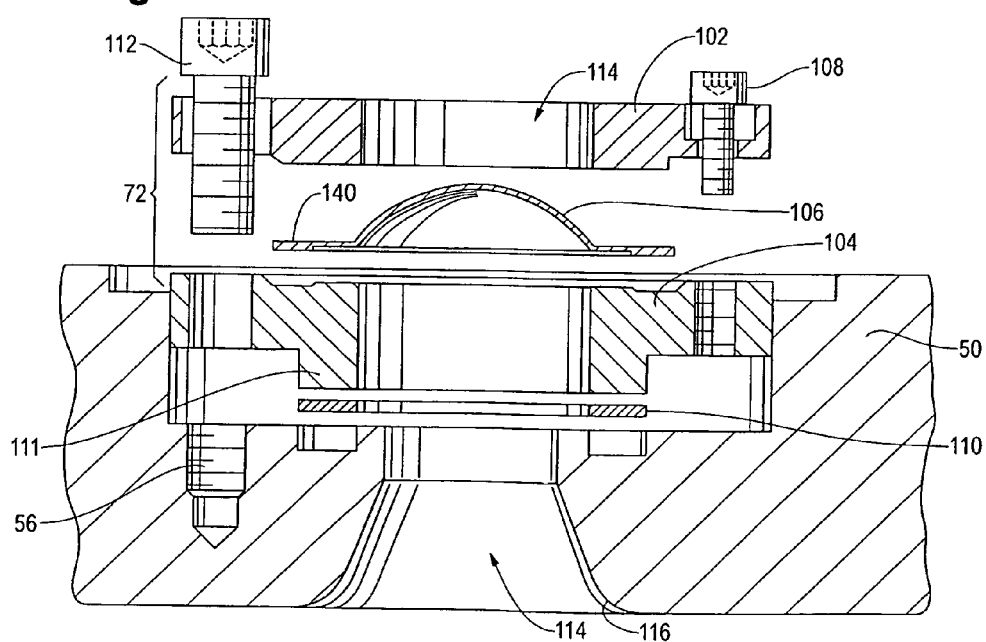

PRESSURE CONTROL AND RELIEF SYSTEM

FIELD OF THE INVENTION

This invention relates generally to pressure control and relief systems, and in more particular applications to pressure relief valve systems including rupture discs.

BACKGROUND

Valves and valve systems are used to control pressure within containers and flow into and out of containers. Further, valves can be used to prevent overpressure situations from occurring. For example, a container may be overfilled such that fluid may potentially rupture the container. Similarly, a tank may be filled to an appropriate level, but as the temperature rises, the pressure within the tank may also rise, thereby causing an overpressure situation. In this manner, an overpressure valve may be used to slowly release fluid and prevent the container from rupturing. Additionally, rupture discs may also be included in such a valve system to prevent fluid from contacting the pressure relief valve until an overpressure condition exists.

Such valves and valve systems can be utilized in a number of applications. For example, these valve systems are often used in rail cars for transporting fluids, including liquids and/or gas. Generally, rail cars include at least one location on the car where inlet and outlet valves may be located, along with other related devices, such as pressure control valves, gauges and other structures. However, generally these valves, including pressure relief valves, are often located on an exterior of the rail car. By having the valves located on the exterior of the rail car, the valves are more prone to being damaged and/or accidentally removed if contacted by other machinery or if the rail car were to overturn.

Valves, including overpressure valves, are also used on other containers such as ISO and tote tanks. In general, an ISO tank is a pressure vessels mounted in a frame that complies with the standards of the International Standards Organization (ISO). ISO and tote tanks are commonly used for transporting chemicals, especially internationally. In some instances, these types of tanks are approximately one quarter the size of rail cars. Additionally, the tanks are built with frames or other structural support surrounding the tank to protect the tank and allow it to sit squarely on the ground or on top of other tanks. These types of tanks can be transported in a number of ways, including, but not limited to, rail, truck and sea.

ISO and tote tanks generally include similar valves and valve systems to those described with respect to rail cars. For example, ISO and tote tanks may include overpressure valves and/or rupture discs for preventing the tanks from rupturing during an overpressure situation. Just as described with respect to rail cars, ISO and tote tanks are also susceptible to tipping over and/or having the valves damaged or broken off by other machinery.

Furthermore, typical pressure relief valves and rupture discs are often interconnected such that if one component requires servicing or replacement, the entire system must be removed. This can be problematic, especially if the tank contains fluid that must be drained prior to removal or servicing of the system.

SUMMARY

In one form, a pressure control system for controlling pressure in a tank is provided. The pressure control system includes a pressure relief valve and a rupture disc subassembly. The pressure relief valve is connected to the tank. The rupture disc subassembly is located between the pressure relief valve and the tank and is connected to the tank. The pressure relief valve is connected such that removal of the pressure relief valve does not affect the connection of the rupture disc subassembly to the tank.

According to one form, a pressure control system for controlling pressure in a tank is provided. The pressure control system includes a pressure relief valve and a rupture disc subassembly. The pressure relief valve is connected to the tank via first connectors. The rupture disc subassembly is located between the pressure relief valve and the tank and is connected to the tank via second connectors. The first and second connectors are independently connected to the tank such that the rupture disc subassembly can stay connected to the tank if the pressure relief valve has been removed.

In accordance with one form, a pressure control system for controlling the pressure in a tank including an exterior surface having an outer surface plane is provided. The system includes a pressure relief valve and a rupture disc subassembly. The pressure relief valve is connected to the tank and located substantially on an outer side of the outer surface plane. The rupture disc subassembly is connected to the tank and located substantially on an inner side of the outer surface plane.

In one form, the exterior surface of the tank includes a recessed portion such that the rupture disc subassembly is located substantially within the recessed portion.

According to one form, the rupture disc subassembly includes a rupture disc and at least one securing plate, the at least one securing plate being removably connected to the tank.

In accordance with one form, the rupture disc subassembly further includes two securing plates and plate connectors such that the subassembly can be assembled with the securing plates, the rupture disc and plate connectors prior to connection to the tank.

In one form, the pressure control system further includes subassembly connectors to removably connect the subassembly to the tank and valve connectors to removably secure the pressure relief valve to the tank.

According to one form, the pressure relief valve can be removed from the tank while the rupture disc subassembly maintains pressure within the tank.

In accordance with one form, wherein the tank is a rail car tank.

In one form, the tank is an ISO tank.

According to one form, the tank is a tote tank.

In accordance with one form, the pressure control valve and rupture disc subassembly are located within a valve cover assembly.

Other forms are also contemplated as understood by those skilled in the art.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its constructions and operation, and many of its advantages should be readily understood and appreciated.

FIG. 8A is a cross-sectional view of the valve system illustrated in FIG. 7 in a first configuration;

FIG. 8B is a cross-sectional view of the valve system illustrated in FIG. 7 in a second configuration;

FIG. 9 is a top view of a rupture disc subassembly installed in a tank plate; and FIG. 10 is an exploded, cross-sectional view of the rupture disc subassembly taken along line 10-10 of FIG. 9.

Figure 1:
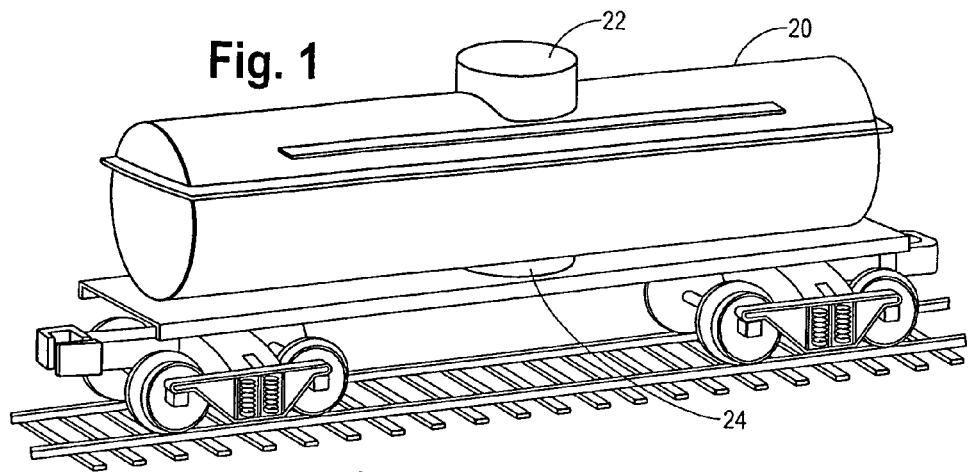
FIG. 1 is a perspective view of a rail car with valves located within a tank car cover.

Various figures are presented to further aid one skilled in the art in understanding the various forms of the pressure control and relief system. However, the present invention should not be construed to be limited to the forms depicted in the figures and described herein.

DETAILED DESCRIPTION

While this invention is susceptible of embodiments in many different forms, there is shown in the drawings and will herein be described in detail a preferred embodiment of the invention with the understanding that the present disclosure is to be considered as an exemplification of the principles of the invention and is not intended to limit the broad aspect of the invention to embodiments illustrated.

Figure 2:
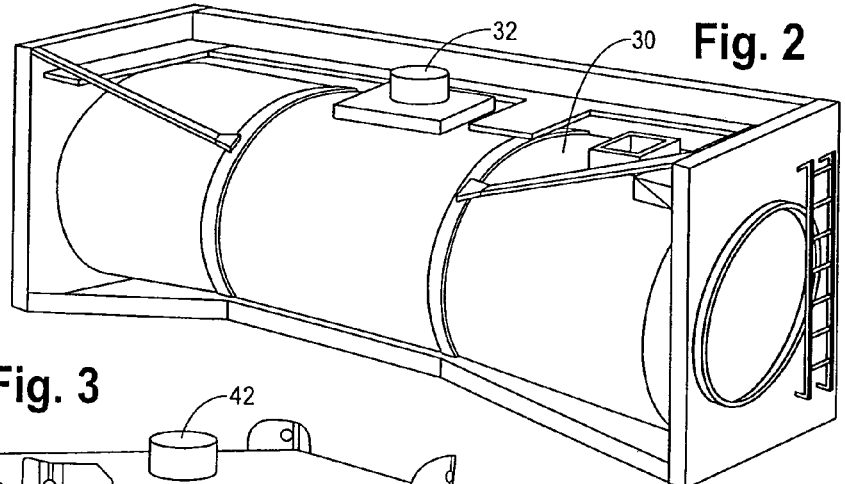
FIG. 2 is a perspective view of an ISO tank with valves located within a valve cover.
Figure 3:
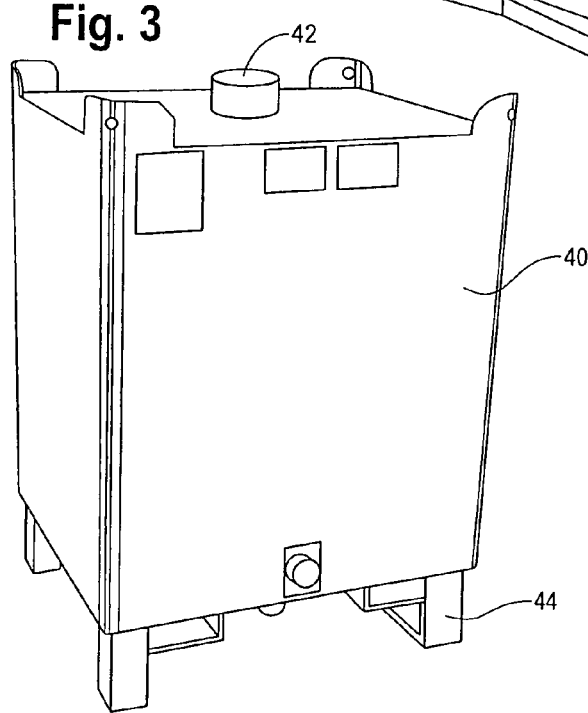
FIG. 3 is a perspective view of a tote tank with valves located within a valve cover.

Referring to FIGS. 1-3, various containers are illustrated. For example, referring to FIG. 1, a rail car 20 is illustrated. The rail car 20 can be used to transport fluids via rail, and more particularly, may be suitable for transporting large volumes of fluids. The rail car 20 includes a cover 22 which can be used to cover various structures and devices, including, but not limited to, valves, gauges, inlets, outlets and other structures. The structures contained under the cover 22 will be explained in more detail below.

Further, the rail car 20 may include other structures as understood by those skilled in the art. For example, the rail car may include a lower cover 24 to contain additional structures similar to those described above. Specifically, the lower cover 24 may contain additional inlets, outlets, valves and gauges. Other features of the rail car 20 will not be discussed herein for the sake of brevity but should be readily understood by those skilled in the art.

Referring now to FIG. 2, an ISO tank 30 is illustrated. The ISO tank 30 includes a cover 32 which can be used to cover various structures and devices, including, but not limited to, valves, gauges, inlets, outlets and other structures. The structures contained under the cover 32 will be explained in more detail below. Generally, the ISO tank 30 is used to transport slightly smaller volumes of fluid and/or may be used for transporting fluids internationally. Additionally, ISO tanks generally include external framework or support 34 to provide extra strength to the tank 30 and also permit the tank 30 to sit squarely on a surface or another tank. Other features of the ISO tank 30 will not be discussed herein for the sake of brevity but should be readily understood by those skilled in the art.

A tote tank 40 is illustrated in FIG. 3. The tote tank 40 includes a cover 42 which can be used to cover various structures and devices, including, but not limited to, valves, gauges, inlets, outlets and other structures. The structures contained under the cover 42 will be explained in more detail below. Generally, the tote tank 40 is used to transport slightly smaller volumes of fluid and/or may be used for transporting fluids internationally. Additionally, tote tanks generally include supports 34 to provide extra strength to the tank 40 and also permit the tank 40 to sit squarely on a surface or another tank. Other features of the tote tank 40 will not be discussed herein for the sake of brevity but should be readily understood by those skilled in the art.

Figure 4:
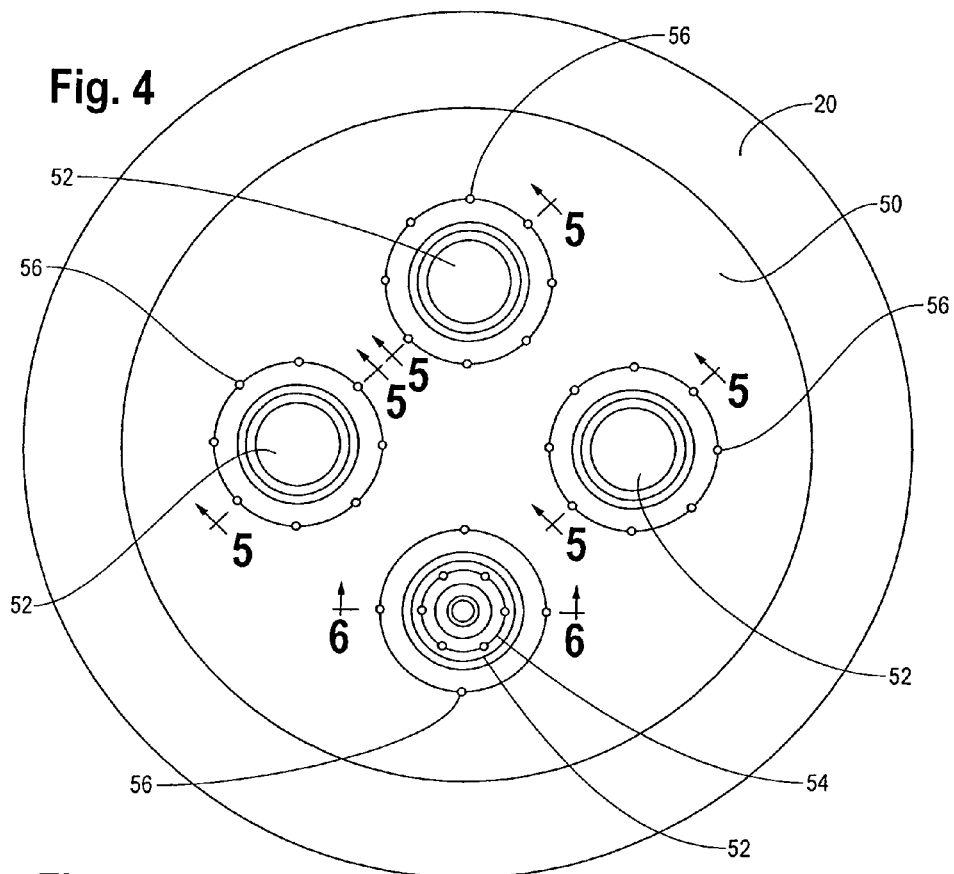
FIG. 4 is a top view of a tank plate with various openings and valve ports.

Referring now to FIG. 4, a plate 50 is illustrated. The plate 50 generally is located beneath a cover for a tank. For example, the plate 50 shown in FIG. 4 is located on the rail car 20 beneath the cover 22. However, it should be understood that the plate 50 may similarly be located on the ISO tank 30 or tote tank 40 or any other suitable tank. Furthermore, it should be understood that the plate 50 need not be enclosed within a cover, but may instead be exposed. Additionally, the plate 50 may also be formed as an integral part of the tank 20 or may be a separate component affixed to the tank 20, as understood by those skilled in the art.

Figure 5:
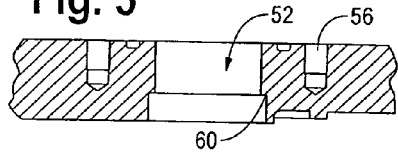
FIG. 5 is a cross-sectional view of an opening taken along line 5-5 of FIG. 4.

The plate 50 may include any number of openings 52. The openings 52 can be used to install valves, gauges, inlets, outlets and the like. For example, as shown in FIG. 5, a rupture disc subassembly 54 is installed in one of the openings 52. Generally, when the tank 20 is in operation to transport fluid, the remaining openings 52 will have valves, gauges or the like or will otherwise be sealed off so as to contain the fluid within the tank 20. In this regard, mounting holes 56 are generally located around the periphery of the openings 52 so as to provide locations for connectors (not shown). It should be understood that any number of mounting holes 56 may be included and further, that other forms of mounting structures besides mounting holes 56 may be used with the openings 52.

Figure 6:
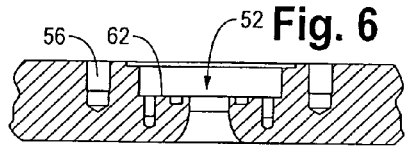
FIG. 6 is a cross-sectional view of an opening taken along line 6-6 of FIG. 4.

Further, as best seen in FIGS. 5 and 6, the openings 52 may include different shapes and sizes as desired for different types of valves, gauges and the like. For example, the opening 52 shown in FIG. 5 may be shaped and sized to receive an angle valve and check valve assembly while the opening in FIG. 6 may be shaped and sized to receive a rupture disc subassembly and a pressure relief valve. Further, it should be understood that the openings 52 may include beveled edges 60, recessed areas 62 and other structures and features depending on the type of valve, gauge or other structure coupled to the opening 52.

Figure 7:
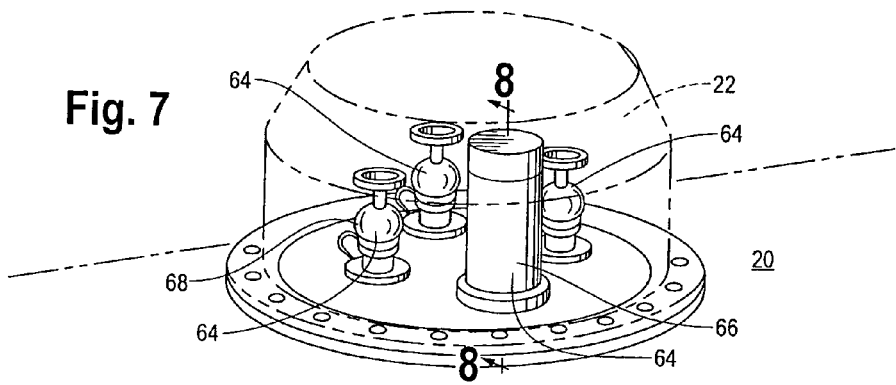
FIG. 7 is a top perspective view of valves installed in a tank plate with a valve cover shown in phantom.

Referring now to FIG. 7, one embodiment of the tank 20 is illustrated with a number of valves 64 installed, including a pressure control system 66 and an angle valve 68. As shown in this figure, when in operation, this embodiment includes the cover 22, shown in phantom, for covering the valves 64 and providing additional protection. However, this cover 22 can be opened when desired to have direct access to the valves 64.

The details of the operation and installation of the pressure control system 66 will now be discussed in more detail. While this system 66 will be discussed as being installed on the tank 20, it should be understood by those skilled in the art that the system 66 can be installed on the ISO tank 30, tote tank 40 and other tanks.

Referring to FIG. 8A, a cross-sectional view of the pressure control system 66 is illustrated. In one form, the pressure control system 66 includes a pressure relief valve 70 and a rupture disc subassembly 72. The pressure control system 66 may also include an exterior body 74 and a cover 76 which can be used to substantially enclose the pressure relief valve 70.

The pressure relief valve 70 generally includes an enclosure 78, a biasing assembly 80, a valve 82, a base 84, a valve seat 86, a valve stem 88 and other components understood by those skilled in the art. The base 84 includes a valve seat 86 which the valve 82 can seal against to maintain pressure. The valve stem 88 extends from the valve 82 and cooperates with the biasing assembly 80 to bias the valve 82 to a closed position. In one form, the biasing assembly includes one or more springs 90 to bias the valve 82. Further, the enclosure 78 can be used to enclose the biasing assembly 80 and valve stem 88. The pressure relief valve 70 may also include other components and features such as gaskets 92 to help seal the valve and a mounting portion 94 located at the base 84 to help provide a secure mounting point between the valve 70 and the tank 20. In this regard, in one form, the pressure relief valve 70 includes valve connectors 96, such as bolts 98 to secure the pressure relief valve 70 to the tank 20. However, it should be understood that other connectors may also be used. Further, the pressure relief valve 70 includes a fluid flow path 100 whereby fluid can flow through the pressure relief valve 70.

As best seen in FIG. 10, the rupture disc subassembly 72 includes a first securing plate 102, a second securing plate 104, a rupture disc 106 and plate connectors 108. The first and second securing plates 102,104 and plate connectors 108 are used to secure the rupture disc 106. While the embodiment illustrated in FIG. 10 has two securing plates 102,104 and connectors 108, it should be understood that the rupture disc 106 can be secured in other manners as understood by those skilled in the art. The rupture disc 106 can be a conventional rupture disc known by those skilled in the art such that the rupture disc 106 will maintain pressure up to a desired pressure, but will break or otherwise lose its seal when the pressure exceeds the desired pressure. The rupture disc 106 can be made from appropriate materials as desired and as necessary for the respective fluids being transported in the tank 20. The subassembly 72 may also include a gasket 110, mounting portion 111 and one or more subassembly connectors 112 for coupling the subassembly 72 to the plate 50 and/or the tank 20. Further, the subassembly 72 defines a fluid flow path 114 for permitting fluid to flow when the seal at the rupture disc 106 is broken during an overpressure condition. The subassembly 72 may also optionally include a curved edge 116 to help fluid flow through the fluid flow path 114 during an overpressure condition.

It should be understood that the subassembly 72 may be assembled prior to installation on the plate 50 and/or the tank 20. Generally, the rupture disc 106 will be sandwiched between the first and second securing plates 102,104 which will be held in place by the plate connectors 108. The subassembly 72 can then be installed on the plate 50 and/or the tank 20 and may use the optional gasket 110 to help provide a fluid tight seal. As best seen in FIGS. 8A,B, the subassembly 72 is connected to the plate 50 substantially on an inner side 120 of an outer surface 122 of the plate 50 using the subassembly connectors 112 which are positioned in the respective mounting holes 56. It should be understood that when installed, the subassembly 72 is located substantially at or below a plane 124 defined by the outer surface 122 of the plate 50 and/or the tank 20. Furthermore, it should be understood that the rupture disc subassembly 72 may be located substantially within the thickness of the exterior surface of the plate 50 and/or the tank 20.

Once the subassembly is installed, the pressure relief valve 70 can be installed on the tank 20. The pressure relief valve 70 is installed over the rupture disc subassembly 72 using the connectors 96 and may include gaskets to help provide a fluid tight seal. In one form, once the pressure relief valve 70 is installed, it can still be maintained while fluid is in the tank 20. Specifically, the enclosure 74 can be removed while the pressure relief valve 70 is still installed on the tank. Alternatively, the pressure relief valve 70 can be removed while the rupture disc subassembly 72 is retained in place on the tank 20.

The operation of the pressure control system 66 would be generally understood by those skilled in the art in view of the drawings and descriptions provided herein. However, a brief overview will be presented for clarity. Referring to FIG. 8A, the pressure control system 66 is shown in a sealed condition whereby no fluid is permitted to exit the system 66. The pressure control system 66 is shown in FIG. 8B in a pressure relief condition, which would likely result from an overpressure condition. In the pressure relief condition, it can be seen that the rupture disc 106 has broken whereby fluid is traveling through the flow path 114, as illustrated by arrow 130. If the pressure in the tank 20 is large enough, it will provide sufficient force to open the valve 82, against the force of the biasing assembly 80. In this regard, fluid will flow out of the pressure relief valve 70, as illustrated by arrows 132. Furthermore, the pressure relief valve 70 may operate such that the valve 82 repeatedly opens and closes as the biasing assembly 80 biases the valve 82 back towards the closed condition.

It should be understood that, in one form, because the rupture disc subassembly 72 is a separate component from the pressure relief valve 70 using separate connectors, the entire pressure relief valve 70 can be removed and replaced or maintained as desired. In this regard, the contents of the tank 20 do not need to be removed when the pressure relief valve 70 is changed or maintained. Also, when in operation, if the tank 20 were to turn over, the pressure relief valve 70 might become sheared off the tank 20. If this were to occur, the rupture disc assembly 72 would likely remain in place and secure as it is substantially located at or below the outer surface 122 of the plate 50. Furthermore, because the rupture disc subassembly 72 is coupled to the tank 20 via separate connectors 112 than the pressure relief valve 70, even if the pressure relief valve 70 connectors 98 were also sheared off, the rupture disc 72 would likely remain in place and secure because of the connectors 112. Therefore, fluid would be prevented from inadvertently leaking out of the pressure control system 66 if the pressure relief valve 70 were sheared off or otherwise removed.

Furthermore, in one form, the installation and connection of the pressure relief valve 70 and rupture disc subassembly 72 helps prevent localized high pressure points on the rupture disc 106. These localized high pressure points can cause premature failure of the rupture disc 106. As shown in FIG. 10, the rupture disc 106 includes an outer periphery 140 which is sandwiched between the securing plates 102,104. In typical assemblies where the rupture disc is affixed to the pressure relief valve, the connection of the pressure relief valve can cause localized high pressure points on the outer periphery adjacent to the bolts connecting the pressure relief valve to the tank. This is generally because the pressure relief valve connectors tend to be large and require significant torque to secure the pressure relief valve. In the forms illustrated in the figures, the rupture disc subassembly 72 is coupled to the tank 20 via separate connectors 112 than the connectors 96 for the pressure relief valve 70. Therefore, the only pressure on the rupture disc 106 is from the connectors 108 and 112. The torque on these connectors 108 and 112 can be set as desired for the rupture disc 106, independent of the torque required to secure the pressure relief valve 70 to the tank 20.

The matter set forth in the foregoing description and accompanying drawings is offered by way of illustration only and not as a limitation. While particular embodiments have been shown and described, it will be obvious to those skilled in the art that changes and modifications may be made without departing from the broader aspects of applicants' contribution. The actual scope of the protection sought is intended to be defined in the following claims when viewed in their proper perspective based on the prior art.

The invention claimed is:

1. A pressure control system for controlling pressure in a tank having a plate, the pressure control system comprising:
    a pressure relief valve;
    a first bolt extending through the pressure relief valve and into the plate to couple the pressure relief valve to the plate;
    a rupture disc subassembly disposed between the pressure relief valve and the plate, the rupture disc subassembly including two securing plates and a rupture disc disposed between the securing plates; and
    a second bolt, independent of the first bolt, extending through the two securing plates and into the plate to removably couple the rupture disc subassembly to the plate, the rupture disc subassembly being removable from the plate from an exterior side of the tank without removing the plate from the tank,
    wherein the pressure relief valve is coupled to the plate such that the pressure relief valve is removable without requiring removal of the coupling of the rupture disc subassembly.

2. The pressure control system of claim 1 wherein the rupture disc subassembly further includes plate connectors adapted to respectively couple the securing plates and the rupture disc disposed between the securing plates prior to coupling of the rupture disc subassembly to the plate.

3. The pressure control system of claim 1 wherein the pressure relief valve can be removed from the plate while the rupture disc subassembly substantially maintains pressure within the tank.

4. The pressure control system of claim 1 wherein the rupture disc subassembly is disposed substantially at or below an outer plane defined by an outer surface of the plate of the tank.

5. The pressure control system of claim 1 wherein the tank is a rail car tank.

6. The pressure control system of claim 1 wherein the tank is an ISO tank.

7. The pressure control system of claim 1 wherein the tank is a tote tank.

8. The pressure control system of claim 1 wherein the pressure relief valve and rupture disc subassembly are disposed within a valve cover assembly.

9. A pressure control system for controlling pressure in a tank, the pressure control system comprising:
    a pressure relief valve having a base;
    a first bolt adapted to extend through the base and into a wall of the tank to couple the pressure relief valve to the tank;
    a rupture disc subassembly disposed between the pressure relief valve and the tank; and
    a second bolt adapted to extend through an aperture disposed in the rupture disc subassembly and into the wall of the tank to couple the rupture disc subassembly to the tank, the second bolt being accessible from an exterior side of the tank when the pressure relief valve is removed from the tank,
    wherein the first and second bolts are adapted to be independently coupled to the tank allowing the rupture disc subassembly to remain coupled to the tank when the pressure relief valve is removed from the tank.

10. The pressure control system of claim 9 wherein the rupture disc subassembly includes a rupture disc and a securing plate removably coupled to the tank.

11. The pressure control system of claim 10 wherein the rupture disc subassembly further includes two securing plates and plate connectors adapted to respectively couple the securing plates and the rupture disc between the securing plates prior to coupling of the rupture disc subassembly to the tank.

12. The pressure control system of claim 9 wherein the pressure relief valve can be removed from the tank while the rupture disc subassembly substantially maintains pressure within the tank.

13. The pressure control system of claim 9 wherein the rupture disc subassembly is disposed substantially at or below an outer plane defined by an outer surface of a cover plate of the tank.

14. The pressure control system of claim 9 wherein the tank is a rail car tank.

15. The pressure control system of claim 9 wherein the tank is an ISO tank.

16. The pressure control system of claim 9 wherein the tank is a tote tank.

17. The pressure control system of claim 9 wherein the pressure relief valve and rupture disc subassembly are disposed within a valve cover assembly.

18. A pressure control system for controlling the pressure in a tank, the pressure control system comprising:
    a plate coupled to the tank and having an exterior surface defining an outer surface plane and separating a first region disposed above the exterior surface, and a second region opposite the first region and disposed below the exterior surface;
    a pressure relief valve adapted to be disposed in the first region and coupled to the exterior surface by a valve connector extending through the pressure relief valve and into the plate; and
    a rupture disc subassembly adapted to be disposed in the second region and coupled to the plate, by a subassembly connector extending through an aperture in the rupture disc subassembly and into the plate, the rupture disc subassembly adapted to be removable from the plate from an exterior side of the tank without removing the plate, and wherein the pressure relief valve can be removed from the plate while the rupture disc subassembly substantially maintains a pressure within the tank.

19. The pressure control system of claim 18 wherein the exterior surface includes a recessed portion, and the rupture disc subassembly is adapted to be coupled to the plate substantially within the recessed portion.

20. The pressure control system of claim 18 wherein the rupture disc subassembly includes a rupture disc and a securing plate adapted to be removably coupled to the plate.

21. The pressure control system of claim 20 wherein the rupture disc subassembly further includes two securing plates, and plate connectors adapted to respectively couple the securing plates and the rupture disc between the securing plates prior to coupling of the rupture disc subassembly to the plate.

22. The pressure control system of claim 18 further comprising more than one subassembly connector adapted to removably couple the rupture disc subassembly to the plate.

23. The pressure control system of claim 18 wherein the tank is a rail car tank.

24. The pressure control system of claim 18 wherein the tank is an ISO tank.

25. The pressure control system of claim 18 wherein the tank is a tote tank.

26. The pressure control system of claim 18 wherein the pressure relief valve and rupture disc subassembly are disposed within a valve cover assembly.

27. The pressure control system of claim 18 wherein the rupture disc subassembly is disposed substantially within a thickness of the plate.

* * * * *